United States Patent
George et al.

(10) Patent No.: US 7,620,665 B1
(45) Date of Patent: Nov. 17, 2009

(54) METHOD AND SYSTEM FOR A GENERIC METADATA-BASED MECHANISM TO MIGRATE RELATIONAL DATA BETWEEN DATABASES

(75) Inventors: Joseph Mulavelil George, Austin, TX (US); Piotr Krychniak, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1959 days.

(21) Appl. No.: 09/717,818

(22) Filed: Nov. 21, 2000

(51) Int. Cl.
*G06F 12/00* (2006.01)
*G06F 17/30* (2006.01)

(52) U.S. Cl. .................... 707/204; 707/100; 711/161

(58) Field of Classification Search ............... 707/204, 707/200, 100, 101, 201, 202, 205, 203; 711/161, 711/162, 154
See application file for complete search history.

(56) References Cited

U.S. PATENT DOCUMENTS

| | | | | |
|---|---|---|---|---|
| 5,133,068 | A | | 7/1992 | Crus et al. ................ 395/600 |
| 5,537,585 | A | * | 7/1996 | Blickenstaff et al. ........ 707/205 |
| 5,566,332 | A | | 10/1996 | Adair et al. ................ 395/600 |
| 5,630,092 | A | | 5/1997 | Carreiro et al. ............. 395/438 |
| 5,642,505 | A | * | 6/1997 | Fushimi ..................... 707/204 |
| 5,644,766 | A | | 7/1997 | Coy et al. .................. 395/620 |
| 5,680,640 | A | * | 10/1997 | Ofek et al. ................... 710/19 |
| 5,737,549 | A | * | 4/1998 | Hersch et al. .............. 709/203 |
| 5,758,150 | A | * | 5/1998 | Bell et al. .................... 707/10 |
| 5,819,086 | A | | 10/1998 | Kroenke ..................... 395/613 |
| 5,819,254 | A | | 10/1998 | Kawai ........................... 707/2 |
| 5,966,717 | A | * | 10/1999 | Sass ........................... 707/204 |
| 6,151,608 | A | * | 11/2000 | Abrams ....................... 707/204 |
| 6,240,422 | B1 | * | 5/2001 | Atkins et al. ................ 707/102 |
| 6,269,382 | B1 | * | 7/2001 | Cabrera et al. .............. 707/204 |
| 6,289,357 | B1 | * | 9/2001 | Parker ........................ 707/202 |
| 6,304,882 | B1 | * | 10/2001 | Strellis et al. ............... 707/202 |
| 6,571,258 | B1 | * | 5/2003 | Borowsky et al. ........... 707/204 |
| 6,591,272 | B1 | * | 7/2003 | Williams .................... 707/102 |
| 6,615,253 | B1 | * | 9/2003 | Bowman-Amuah ......... 709/219 |
| 6,633,878 | B1 | * | 10/2003 | Underwood ................ 707/100 |
| 6,636,876 | B1 | * | 10/2003 | Ishihara et al. ............. 707/202 |
| 6,874,141 | B1 | * | 3/2005 | Swamy et al. ............... 717/144 |
| 7,080,085 | B1 | * | 7/2006 | Choy et al. .................. 707/101 |

OTHER PUBLICATIONS

"Object Framework for Database Management and Connectivity", Disclosure #41393, *Research Disclosure*, p. 1240, Sep. 1998.

\* cited by examiner

*Primary Examiner*—Greta L Robinson
(74) *Attorney, Agent, or Firm*—Yee & Associates, P.C.; Jeffrey S. LaBaw (57) ABSTRACT

A method and system for migrating data between databases is provided. Metadata is obtained from a source database and used to determine the manner in which the data within the source database should be migrated to a target database. The metadata provides a mechanism for structuring queries to retrieve the data within the source database in a generic manner, thereby providing a generic determination of the structure of the data to be migrated. The dependencies among tables in the source database are discovered, thereby providing an order to the migration operations to be performed when migrating the data. This order ensures that the data can be migrated correctly in the presence of referential integrity (foreign key) constraints. In addition, custom mapping operations may be performed during the migration operations so that the data from the source database is modified before writing the data to the target database.

6 Claims, 7 Drawing Sheets

610
```xml
<Table name="AUTH_TABLE" numattributes="4">
  <PrimaryKey>
    <Field name="AUTHOR_ID" pos="1">
        <Type> VARCHAR2 </Type>
        <Nullable> FALSE </Nullable>
        <Length> 20 </Length>
    </Field>
  </PrimaryKey>
  <Field name="NAME" pos="2">
        <Type> VARCHAR2 </Type>
        <Nullable> FALSE </Nullable>
        <Length> 40 </Length>
  </Field>
  <Field name="URL" pos="3">
        <Type> VARCHAR2 </Type>
        <Nullable> FALSE </Nullable>
        <Length> 1024 </Length>
  </Field>
  <Field name="DESCRIPTION" pos="4">
        <Type> VARCHAR2 </Type>
        <Nullable> FALSE </Nullable>
        <Length> 512 </Length>
  </Field>
</Table>
```

620
```xml
<MappingRecord TargetTablename="T_AUTH_TABLE" >
   <SourceTableName> AUTH_TABLE </SourceTableName>
   <Field position="1">
      <TargetFieldName type= "String"> T_AUTHOR_ID </TargetFieldName>
      <SourceFieldName> AUTHOR_ID </SourceFieldName>
      <Truncatable> NO </Truncatable>
   </Field>
   <Field position="2">
      <TargetFieldName type= "String"> T_AUTHOR_NAME </TargetFieldName>
      <SourceFieldName> NAME </SourceFieldName>
      <Truncatable> NO </Truncatable>
   </Field>
   <Field position="3">
      <TargetFieldName type= "String"> T_URL </ClassField>
      <SourceFieldName> URL </SourceFieldName>
      <Truncatable> NO </Truncatable>
   </Field>
   <Field position="4">
      <TargetFieldName type= "String"> T_DESCRIPTION </TargetFieldName>
      <SourceFieldName> DESCRIPTION </SourceFieldName>
      <Truncatable> YES </Truncatable>
   </Field>
   <Field position="5" default="Unknown">
      <TargetFieldName type= "String"> T_LOCATION </TargetFieldName>
      <SourceFieldName></SourceFieldName>
   </Field>
</MappingRecord>
```

```
<Table Name="AUTH_TABLE">
    <PrimaryKey>
        <Field name="AUTHOR_ID" type="VARCHAR2"></Field>
    </PrimaryKey>
    <Dependent Name="BOOK_AUTH_TABLE">
        <ForeignKey>
            <Attribute position="1">
                <Parent>AUTHOR_ID</Parent>
                <Child>AUTHOR_ID</Child>
            </Attribute>
        </ForeignKey>
    </Dependent>
</Table>

<Table Name="BOOK_AUTH_TABLE">
    <PrimaryKey>
        <Field name="ISBN" type="VARCHAR2"></Field>
    </PrimaryKey>
    <Dependent Name="BOOK_TABLE">
        <ForeignKey>
            <Attribute position="1">
                <Parent>ISBN</Parent>
                <Child>ISBN</Child>
            </Attibute>
        </ForeignKey>
    </Dependent>
</Table>

<Table Name="BOOK_TABLE">
    <PrimaryKey>
        <Field name="ISBN" type="VARCHAR2"></Field>
    </PrimaryKey>
</Table>
```

*FIG. 6D*

METHOD AND SYSTEM FOR A GENERIC METADATA-BASED MECHANISM TO MIGRATE RELATIONAL DATA BETWEEN DATABASES

CROSS-REFERENCE TO RELATED APPLICATIONS

The present application is related to the following applications: application Ser. No. 09/544,274, filed Apr. 6, 2000, titled "Apparatus and Method for Deletion of Objects From an Object-Relational System in a Customizable and Database Independent Manner"; application Ser. No. 09/717,809, filed Nov. 21, 2000, titled "Method and System for an Object Model with Embedded Metadata and Mapping Information".

BACKGROUND OF THE INVENTION

1. Field of the Invention

The present invention relates to an improved data processing system and, in particular, to a method and system for using a database. Still more particularly, the present invention provides a method and system for moving data between databases.

2. Description of Related Art

Most enterprises today have large information technology (IT) infrastructures. As an enterprise expands its operations and offered services, more data is generated and gathered, and its data storage and data processing requirements also grow. In a manner similar to upgrading and replacing its computer hardware, an enterprise may also need to update and replace the database products that serve its data storage and data processing requirements. In addition, many datasets may be regarded by an enterprise as being mission-critical and worthy of extensive backup in different forms. Hence, data is often migrated between two databases with the same, or at least very similar, schemas.

Many database tools are commercially available for migrating data between databases. However, these tools are generally proprietary and do not operate across different vendor databases.

Therefore, it would be advantageous to provide a method and system for generically migrating data from one relational database to another. It would be especially advantageous to allow the data migration to be customizable and extensible to support custom mappings.

SUMMARY OF THE INVENTION

A method and system for migrating data between databases is provided. Metadata is obtained from a source database, and the metadata includes definitions for tables in the source database. The metadata is then used to determine the manner in which the data within the source database should be migrated to a target database. By structuring queries in accordance with the definitions of the tables, the metadata provides a generic determination of the structure of the data to be migrated. The dependencies among tables in the source database are also discovered, and these dependencies determine the order in which the migration operations should be performed when migrating the data. In addition, custom mapping operations may be performed during the migration operations so that the data from the source database is modified before writing the data to the target database.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIGS. 6A-6D are a set of diagrams that provide metadata information, mapping information, an exemplary target table, and table dependency information in an XML-formatted manner for use in migrating a database.

DETAILED DESCRIPTION OF THE INVENTION

Figure 1A:
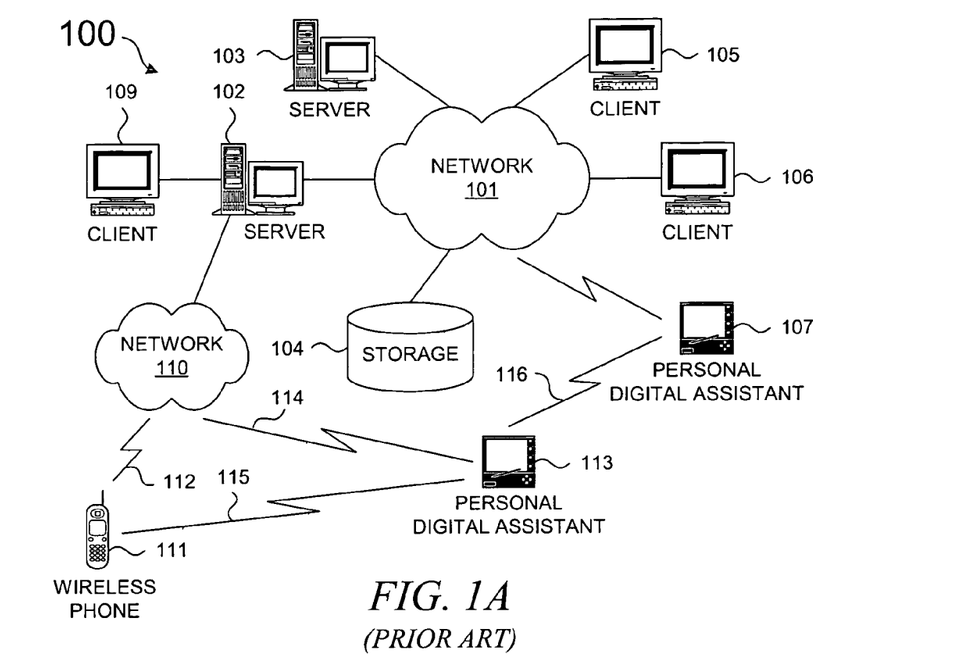
FIG. 1A depicts a typical distributed data processing system in which the present invention may be implemented.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as LDAP, TCP/IP, HTTP, etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks or personal ad-hoc networks. In a similar manner, PDA 113 can transfer data to PDA 117 via wireless communication link 116.

The present invention could be implemented on a variety of hardware platforms; FIG. 1A is intended as an example of a heterogeneous computing environment and not as an architectural limitation for the present invention.

Figure 1B:
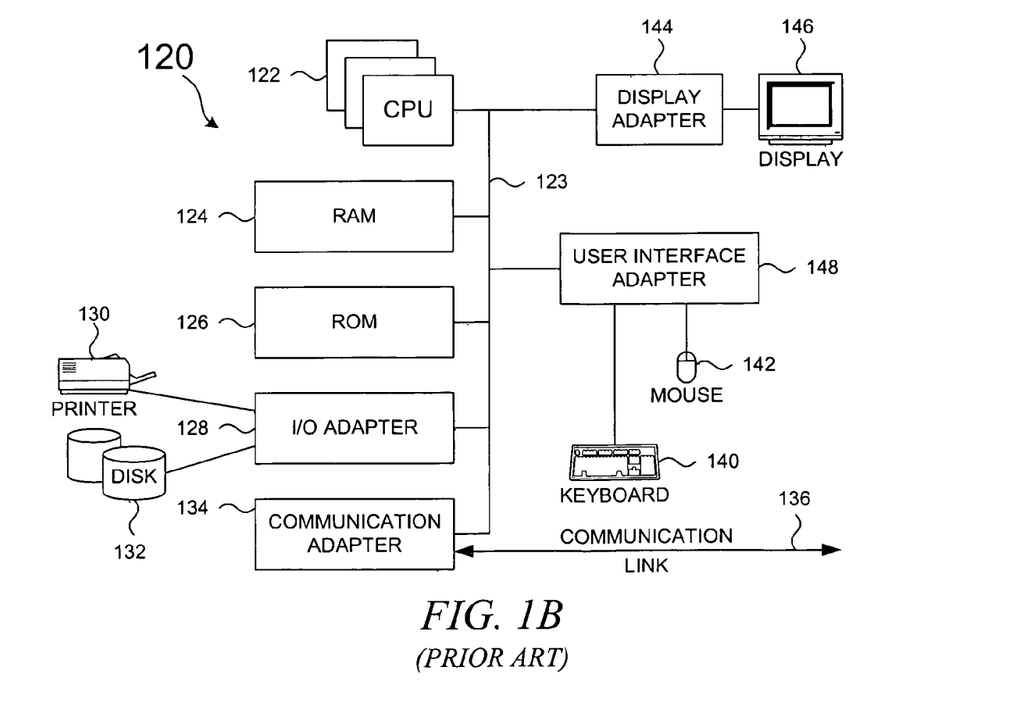
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a sound system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors and one or more types of non-volatile memory. Other peripheral devices may be used in addition to or in place of the hardware depicted in FIG. 1B. In other words, one of ordinary skill in the art would not expect to find similar components or architectures within a network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix™ operating system, while another device contains a simple Java™ runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files. Hence, it should be noted that the distributed data processing system shown in FIG. 1A is contemplated as being fully able to support a variety of peer-to-peer subnets and peer-to-peer services.

The present invention may be implemented on a variety of hardware and software platforms, as described above. More specifically, though, the present invention is directed to providing a method and system for migrating data between databases. As background, a typical relational database is described before describing the present invention in more detail.

While the present invention will be described with reference to preferred embodiments in which Java applications are utilized, the invention is not limited to the use of the Java programming language. Rather, any programming language may be utilized with the principles of the present invention. The only requirement is that there must be some means for obtaining the structure of the relational database in the form of metadata information. For example, the present invention may be implemented using Microsoft Open Database Connectivity (ODBC). The ODBC driver provides links to such A server/client database systems as Oracle and SQL Server and to desktop database systems such as dBASE and FoxPro.

The present invention may be implemented within a variety of system configurations. For example, if the system makes use of a traditional client/server application, the present invention may be implemented at the client device. If the system makes use of a three-tier application, the present invention may be implemented at a server. Furthermore, the client and server devices may be implemented as client and server processes on the same physical device. Thus, with regard to the descriptions of the preferred embodiments herein, client and server may constitute separate remote devices or the same device operating in two separate capacities. Thus, the application tools according to the present invention may be stored in local memory, executed by a device's processor, and use the device's network connections.

Figure 2:
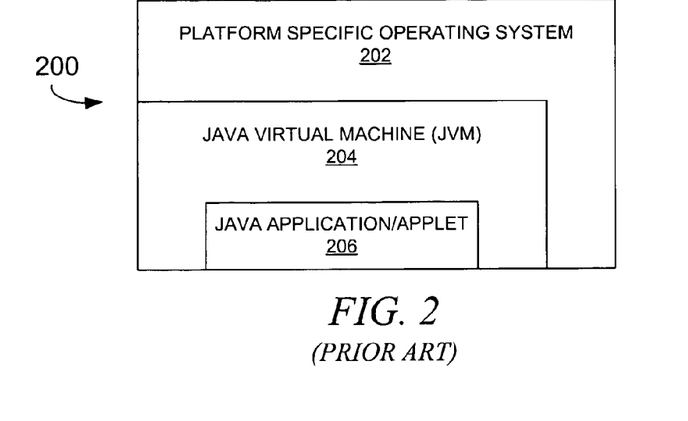
FIG. 2 is a block diagram that illustrates the relationship of typical software components within a computer system that may implement the present invention.

With reference now to FIG. 2, a block diagram illustrates the relationship of typical software components operating within a computer system that may implement the present invention. Java-based system 200 contains platform specific operating system 202 that provides hardware and system support to software executing on a specific hardware platform. JVM 204 is one software application that may execute in conjunction with the operating system. JVM 204 provides a Java run-time environment with the ability to execute Java application or applet 206, which is a program, servlet, or software component written in the Java programming language. The computer system in which JVM 204 operates may be similar to data processing system 120 described above. However, JVM 204 may be implemented in dedicated hardware on a so-called Java chip, Java-on-silicon, or Java processor with an embedded picoJava core.

JVM 204 is the center of a Java run-time environment and supports all aspects of the Java environment, including its architecture, security features, mobility across networks, and platform independence. JVM 204 is a virtual computer that executes Java programs. JVM 204 is, in essence, a computer that is specified abstractly. The JVM loads class files and executes the bytecodes within them. The various Java specifications define certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

In the preferred embodiment, Java Database Connectivity (JDBC) application interfaces are used to communicate with the relational database. JDBC application interfaces are application interfaces that are used to access heterogeneous databases in a transparent manner. The Java Database Connectivity (JDBC) kit was developed for Java to allow programmers to connect to a database and query it or update it using the Structured Query Language (SQL). JDBC can be used in both Java applications and applets. These applications and applets can be implemented as a traditional client/server program, as shown in FIG. 3A, or as a three-tier application as shown in FIG. 3B.

Figure 3A:
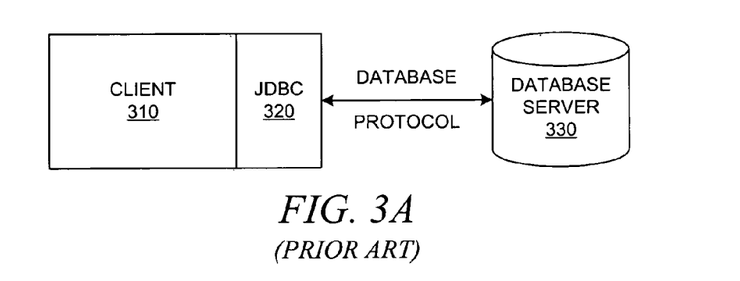
FIGS. 3A and 3B are diagrams illustrating exemplary data paths taken by requests and commands to use information stored in a relational database resident on a database server.
Figure 3B:
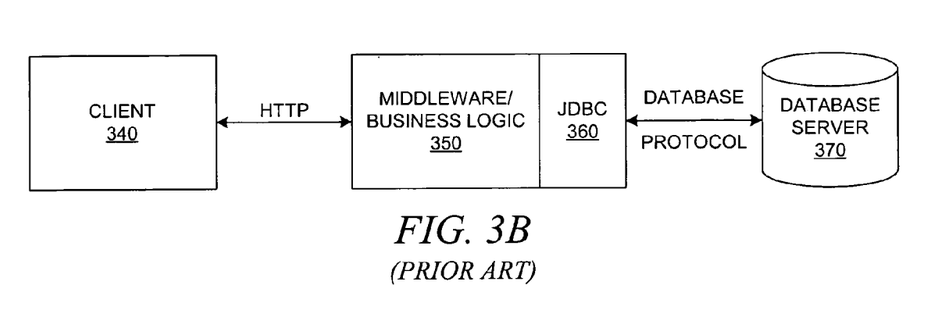

With reference now to FIGS. 3A and 3B, diagrams illustrate exemplary data paths taken by requests and commands to store object-oriented data in a relational database resident on a database server. As shown in FIG. 3A, in a traditional client/server program, client 310 uses JDBC 320 to establish a communication connection with the database server 330 using a database protocol. In a three-tier application as shown in FIG. 3B, client 340 does not make database calls. Instead, the client 340 calls on a middleware layer 350 on the server that in turn makes the database queries using JDBC 360.

The three-tier model separates the visual presentation from the business logic, i.e. the Java applications, and the raw data in the database 370. Therefore, it becomes possible for the same data and same business rules to be accessed from multiple clients. Communication between client 340 and middleware 350 can occur by using various protocols such as HTTP (Hypertext Transport Protocol), RMI (Remote Method Invocation), and the like. Communication between middleware 350 and database server 370 occurs using JDBC 360 and a database protocol. The present invention is equally applicable to either the client/server or the three-tier structure shown in FIGS. 3A and 3B. For purposes of illustration, it will be assumed with regard to the embodiments described herein that the traditional client/server structure is utilized.

Figure 4:
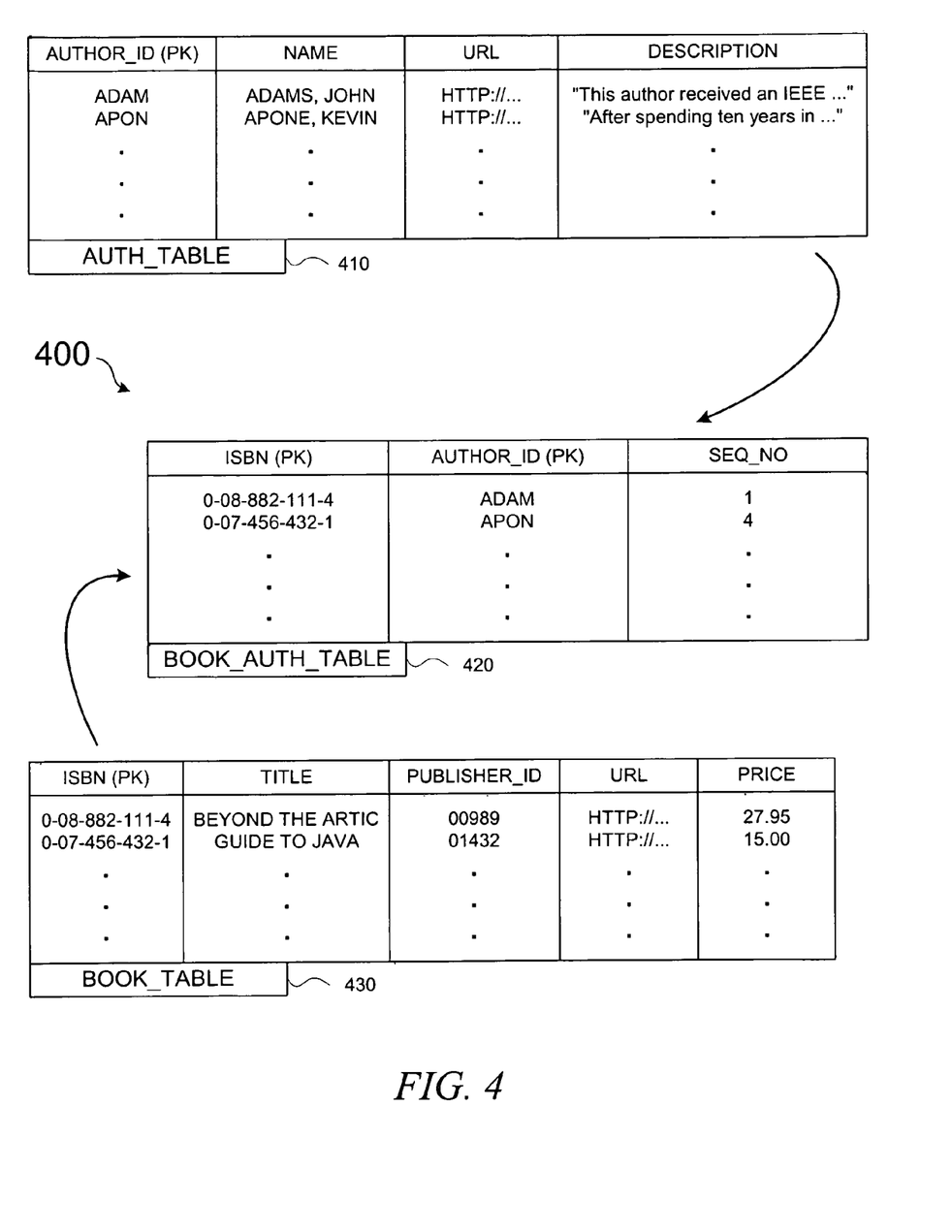
FIG. 4 is an exemplary diagram illustrating a relational database.

With reference now to FIG. 4, exemplary tables illustrate a simplified relational database in which object data is stored. A relational database can be utilized in an object-relational system, i.e. a system in which applications operate on objects which are mapped to the corresponding data representations, i.e. records, in tables of a relational database. As shown in FIG. 4, the relational database is comprised of a plurality of tables 410-430 which are linked based on common attributes shown as columns in the tables.

Table 410 includes information identifying authors. The table 410 includes such information as the author identification, the author's name, and a uniform resource locator (URL) associated with the author. The author record is a data representation of an author object that may be utilized by a Java application.

The primary key (PK) of the table 410 (AUTH_TABLE) is the author identifier, or AUTHOR_ID. The primary key is the attribute that uniquely identifies a record in the table. Thus, the AUTHOR_ID in table 410 is the primary key since multiple authors may have the same name but will have different AUTHOR_IDs.

Table 430 (BOOK_TABLE) includes information identifying books. The table 430 includes such information as the TITLE of the book, the ISBN, the PUBLISHER_ID, an associated URL, and a PRICE for the book. The primary key for the records in the table 430 is the ISBN since this attribute uniquely identifies a book in the table 430. "ISBN" stands for "International Standard Book Number" and is a unique ten digit number assigned to each published book in many countries.

Table 420 (BOOK_AUTH_TABLE) includes information identifying book authors. The table 420 includes such information as the ISBN of the book(s) authored by the author, the author's AUTHOR_ID, and a SEQ_NO (sequence number) for the author. This information shows the authors for a specific book as well as the books authored by a specific author. It represents an intersection entity that maps the many-many relationship between authors and books. The primary key for the records in table 420 is the combination of the (Author_ID, ISBN) pair which uniquely identifies each record. In addition, table 420 includes the foreign keys AUTHOR_ID from table 410 (AUTH_TABLE) and ISBN from table 430 (BOOK_TABLE). A foreign key is a primary key of one table that is present in another table. The tables 410-420-430 are linked by way of their primary and foreign keys.

Thus, based on the primary and foreign keys of the tables 410-420-430, the book-author object data in table 420 may not exist independently of the author object data in table 410 or the book object data in table 430. In other words, the primary key (Author_ID) of the table 410, i.e. a foreign key in table 420, is a proper subset of the primary key of table 420. Similarly, the primary key (ISBN) of the table 430 is also a proper subset of the primary key of table 420. A foreign key is a "proper subset" of the primary key if the foreign key includes some or all of the primary keys of the table. Therefore; if an object in table 410 is to be deleted, such as the author "Adams, John", the book author object data corresponding to "Adams, John" in table 420 must be deleted also.

The JDBC kit (APIs) provides a mechanism for providing information about the structure of a relational database and its tables. For example, a user can get a list of tables in a particular relational database, the column names, types of tables, and the like. This information is known as JDBC database metadata. The metadata may also include size limitations on fields and records with the database, not-nullable constraints, etc. While the JDBC kit is utilized in the descriptions of the preferred embodiments herein, it should be appreciated by those of ordinary skill in the art that the JDBC kit is only an exemplary mechanism for providing structure information of a relational database and other mechanisms may be employed without departing from the spirit and scope of the present invention. Many commercially available database products provide some manner of retrieving metadata about an implemented database.

As noted above, the present invention is operable within a variety of hardware architectures and software environments. FIGS. 2-4 provide background information concerning an object-relational system. More specifically, the present invention provides a generic methodology for migrating data from one relational database to another in a manner that is customizable, extensible, and vendor-independent with respect to database application products.

Figure 5A:
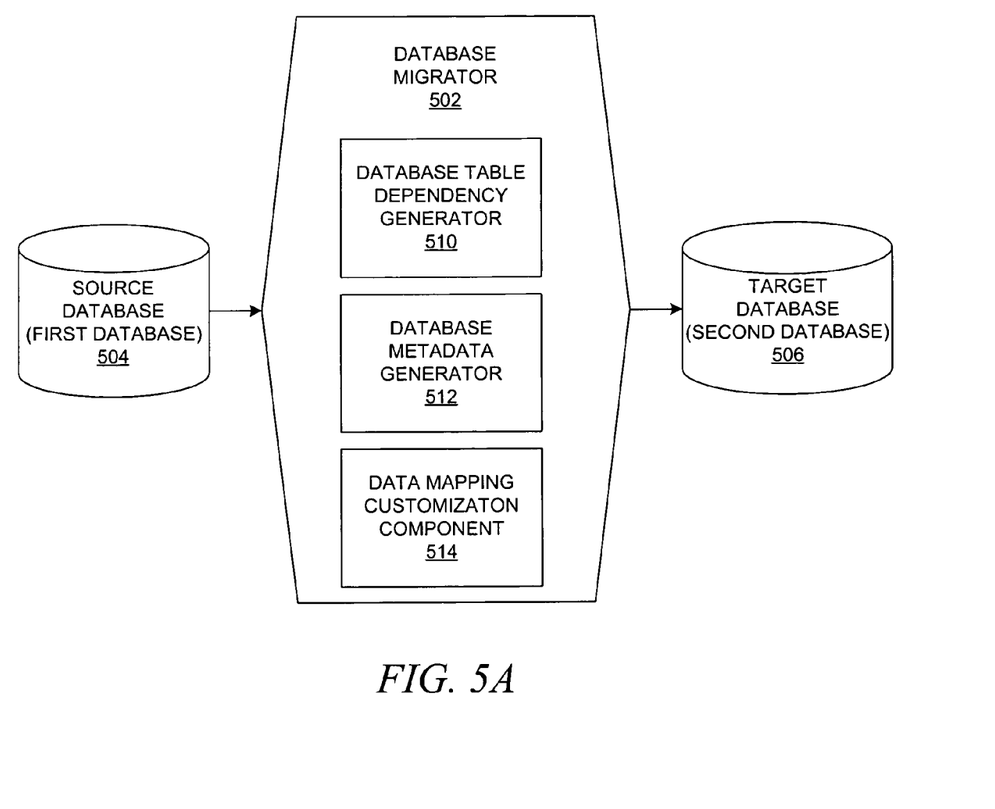
FIG. 5A is a diagram depicting the data flow between the database migrator, the databases, and other components.

With reference now to FIG. 5A, a diagram depicts the data flow between the database migrator, the databases, and other components in accordance with a preferred embodiment of the present invention. Database migrator 502 reads data from source database 504 and copies or relocates the data into target database 506. Database migrator 502 may be a stand-alone database application for migrating data from one database to another database. Alternatively, database migrator 502 may be a software package, a software library, an application, or an applet that is operable by other software components to perform the migration functionality. Database migrator 502 may or may not be object-oriented as required within a given system installation. In this description, since the JDBC APIs are used to obtain database metadata information, the migrator application is also implemented in Java.

Databases 502 and 504 may be used to persist objects and their attributes in a well-known, object-oriented manner, such as the manner described above with respect to FIGS. 3A-3B. Alternatively, databases 502 and 504 may be simple relational databases. In addition, databases 502 and 504 may be served or supported by one or more vendor-specific database engines.

Database table dependency generator 510 discovers the type and extent of dependencies among the tables in source database 504. In order to migrate the data in the correct sequence, the dependencies among the tables must be established, and these dependencies should be available in a programmatically-accessible format. In the preferred embodiment, the dependencies between tables can be represented using elements within an XML-formatted document, which is described in more detail further below. This dependency information can be obtained during a "first pass", i.e. a pre-processing or pre-migration phase, before the actual data migration is commenced. Alternatively, as is well known in the art, the creation of referential integrity constraints in the target database can be deferred until after all of the data has been migrated.

Database metadata generator 512 retrieves available metadata from source database 504 by querying source database 504 and storing or caching the metadata. The data migration of the present invention is guided by using the metadata for each table in source database 504. This metadata information comprises definitions of each table, the columns in each table, the type definitions of those columns, and any other constraints related to the tables. This metadata information can also be gathered during a pre-migration phase and then stored or cached in an intermediate format. In the preferred embodiment, the metadata information can be represented using elements within an XML-formatted document, which is described in more detail further below.

These data definitions in the metadata provide a structure for a query operation on the source database. For example, the source database may be accessible through a database application, database engine, database server, etc., that supports SQL (Structured Query Language). After parsing the metadata, one can use the data type information, etc., to construct SQL commands that are issued to the database engine to retrieve the data stored within the source database. These SQL commands are executed using command execution calls in the JDBC API.

The metadata provides a clear structure for the source database tables and thus enables generic read capabilities. Referring ahead to FIG. 6A, the figure shows the metadata information for the table AUTH_TABLE (410). The metadata shows that there are 4 fields in the table and that the fields are all strings, as indicated by the VARCHAR2 type. Thus, the runtime operation of the reading component can interpret this metadata information generically to determine that each record in the AUTH_TABLE comprises 4 string fields and must be read accordingly.

Referring again to FIG. 5A, data mapping customization component 514 performs any optional custom transformations of data by applying mapping transformations after data is read from source database 504 but before data is written to target database 506. The optional transformations are established before any data migration is performed. The custom transformations can be stored in a mapping repository and retrieved as needed. In the preferred embodiment, the customization information can be represented using elements within an XML-formatted document, which is described in more detail further below.

The customization information, the dependency information, and the metadata information need to be available to the database migrator component in a manner that allows it to be accessed programmatically. In other words, each of these sets of information must be able to be interpreted or parsed within the database migrator. The information may be formatted in a variety of manners, but these sets of information are preferably available as XML documents. For example, database migrator 502 can receive JDBC database metadata as input and can create an intermediate or temporary markup language file describing the metadata information. These information sets may be stored as appropriate, either as separate files, in other databases, within database 504 or 506, etc.

Figure 5B:
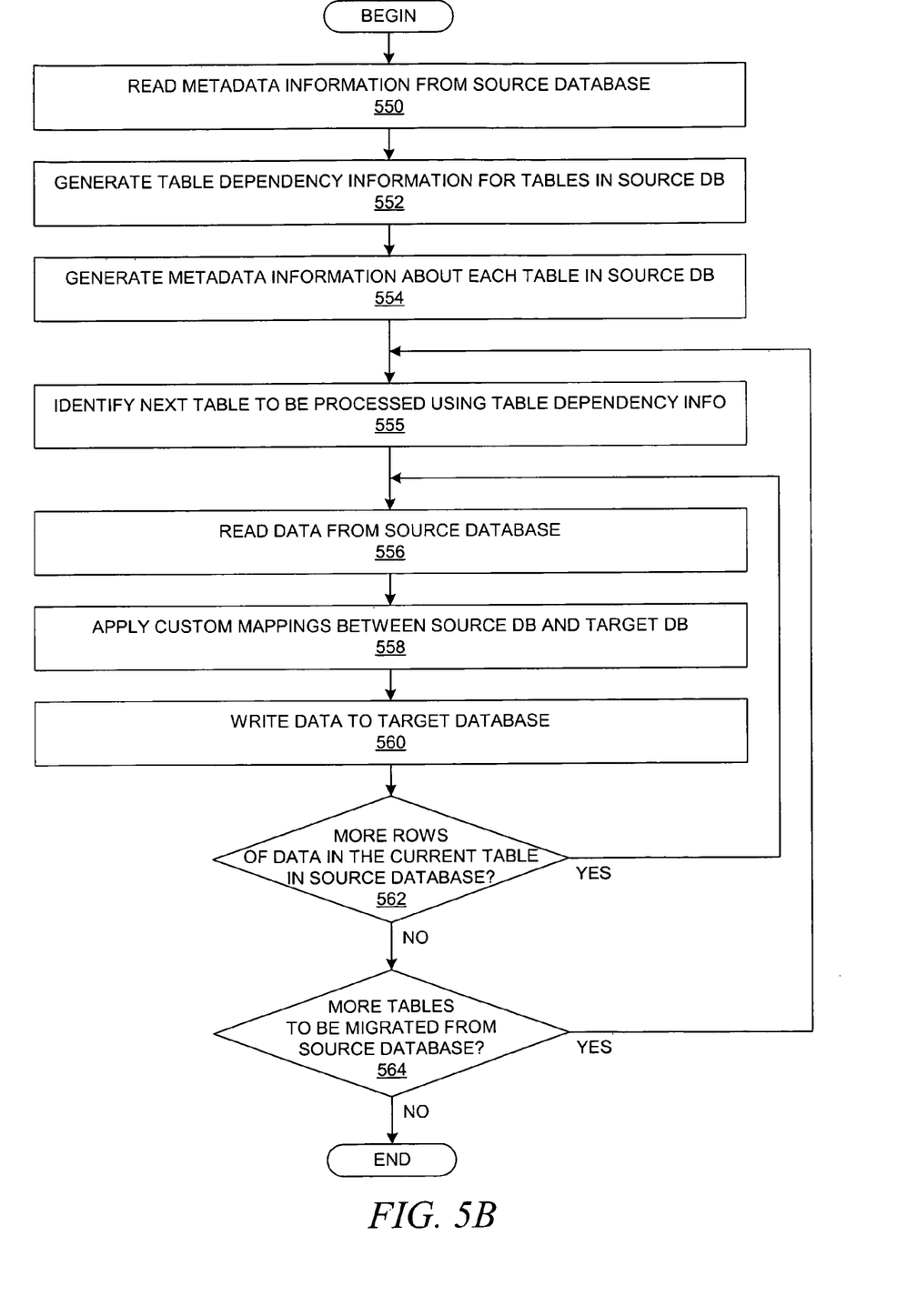
FIG. 5B is a flowchart depicting a process for migrating data between relational databases.

With reference now to FIG. 5B, a flowchart depicts a process for migrating data between relational databases in accordance with a preferred embodiment of the present invention. The process, which may be implemented within a system similar to that shown in FIG. 5A, begins by reading or obtaining the metadata information from the relational database (step 550). Information about the dependencies among the tables in the source database is then obtained by using the metadata information read in step 550 in conjunction with optionally defined heuristics (step 552). The dependencies can be represented in an intermediate format for subsequent use to control the order of migrating the tables in the source database. The metadata information obtained in step 550 can then be used to identify and organize metadata information about each table in the source database (step 554). It should be noted that step 552 or step 554 can happen in any order, but step 550 must be performed before either step 552 or step 554. The metadata information can also be represented in an intermediate format for subsequent use to control the manner in which each data item or data chunk is migrated.

The process then enters a loop to migrate the actual data from the source database to the target database; the order of migration is provided by the table dependency information and metadata information that has been gathered beforehand (step 555). The data is migrated one table at a time, with each row of each table being migrated one row at a time.

The order of migration of data should follow a breadth-first-search (BFS) traversal of the dependency tree, which ensures that tables without any dependencies are migrated first, thereby preventing the occurrence of any referential integrity constraint violations when data in dependent tables is written. In other words, when the data in a table is migrated, the BFS traversal order ensures that any data that needs to exist for the data in the current table to be written has already been migrated. Because the metadata from each table is available, having been acquired in step 554, it is possible to interpret the data read from the database in a generic manner. The process continues when a row of data from a table stored within the source database is then retrieved (step 556) in accordance with the previously compiled dependency information.

Any predetermined custom transformations, i.e. optionally defined heuristics, between the source tables and the target tables are then applied to the data (step 558). The row of data is then written to a corresponding table in the target database (step 560). Database commands may be issued as necessary to write the data to the target database depending upon the type of target database. For example, assuming that the target database supports SQL, SQL statements may be issued by the database migrator component to the target database engine or server to write the data into the target database. Similar to the read operation on the source database, the metadata information allows the write operation logic to be generic. For example, to migrate data from the AUTH_TABLE table shown in FIG. 4, we need to write 4 string fields for each record as defined in the metadata derived for the AUTH_TABLE table.

A determination is then made as to whether or not there are any more rows of data for the table that is currently being migrated (step 562). If so, then the process branches back to step 556 to migrate more data. If the current table has been completely migrated, then a determination is made as to whether or not any more tables of data have not yet been migrated from the source database to the target database (step 564). If so, then the process branches back to step 555 to migrate another table. The next table to be migrated is chosen based on the dependency information obtained in step 552. Otherwise, the entire source database has been migrated, and the process is complete.

With reference now to FIGS. 6A-6D, a set of diagrams provide metadata information, mapping information, an exemplary target table, and table dependency information that may be used in accordance with a preferred embodiment of the present invention. The examples shown in FIGS. 6A-6C continue the example shown in FIG. 4.

FIG. 6A shows metadata information for table 410 in FIG. 4 that has been retrieved from the database. Depending upon the implementation and the size and number of tables, the metadata information may be more detailed. In this example, the metadata information has been formatted as an XML document. Each table entity contains elements and sub-elements with information on each record field or column within the table, such as the name of the field, its position, and its data type.

Metadata information 610 may also contain database constraints, size limits, and other potential database limitations to be used when migrating data between databases. In metadata information 610, each record field has an associated constraint "Nullable" that indicates whether or not a field can be "NULL" when stored within the database. In addition, each field element has a sub-element "Length" that indicates the maximum length of the data that may be stored within the database field, thereby providing a type of size constraint. Other constraints or limitations may be shown in a similar manner if necessary for a particular database implementation.

FIG. 6B shows an example of custom mapping information that may be stored using an XML format, although other data formats could be used. Mapping information 620 defines how custom transformations can be applied to the data that is being migrated between the corresponding tables in the databases. This information is generated, either manually or automatically, during the development of the corresponding database schemas, i.e. it is statically defined. The mapping record shown in FIG. 6B is the simplified case of a single table mapping to a single table. In this case, the structure of the source and target tables are the same, and only the names of the fields and the table are different.

Depending upon the desired implementation, it is possible for more complex transformations to be applied when mapping data between multiple tables, and the mapping record would reflect this accordingly. For example, the target AUTH_TABLE might now have a new field AUTHOR_AGENT that indicates the name of the authors agent. A simple mapping transformation could specify that the value of this field in the target table should be set to "UNKNOWN". A more sophisticated mapping transformation could specify that all authors with AUTH_IDs from "A" to "M" should have a value of "JOE SMITH" in the AUTHOR_AGENT field and all others should be given a value of "DAVID JONES".

In FIG. 4, author table 410 has columns "Author_ID", "Name", "URL", and "Description" as fields within each record in the table. Each attribute within the author table has a corresponding entry within the mapping record in FIG. 6B which provides the name of the source database field as indicated by the "SourceFieldName" XML element. Associated with each source database field is semantic information indicating whether or not the field is truncatable. The target field name in the target database is identified by the "TargetFieldName" XML element, which also specifies the data type of that attribute.

In XML terminology, each "MappingRecord" element associates a particular table in the target database, as indicated by the "TargetTableName" property associated with each "MappingRecord", with a table in the source database, as indicated by the "SourceTableName" element. Each "MappingRecord" entity has one "Field" element for each field in the target table with an element property indicating its relative "Position". Each "Field" element then has subelements linking each target field "TargetFieldName" with a source database column "SourceFieldName" and associated semantic information.

By comparing FIGS. 6A-6B, one can see that the names of the fields in a particular table in the source database, as retrieved in metadata information 610, and the names of the fields in the target database are mapped together by mapping information 620. With the associations between the source database fields and the target database fields provided by the mapping records, custom transformations can be easily associated with the appropriate tables.

Figure 6C:
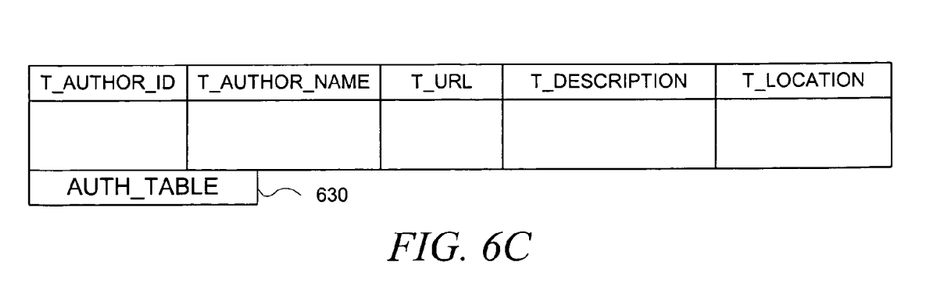

In the example shown in FIG. 6B, the "MappingRecord" entity has one "Field" element, "T_LOCATION", for an additional field in the target table which does not have a corresponding field in the source table. The name of the source field has been left empty, and a default property value of "UNKNOWN" has been specified as the value that should be assigned to the field in the target table when a source table is migrated. FIG. 6C shows a target table with a similar structure to the source table shown in FIG. 4 except that target table 630 has an additional field, "T_LOCATION", that would have a data value set to "UNKNOWN" the data migration operation as specified by the mapping record shown in FIG. 6B.

As an alternative method of setting a default value while using an XML-formatted file, a function may be defined within the database migrator component such that any field of type "string" that has an empty element is set equal to "UNKNOWN". More complex functions could be defined as necessary.

Although the examples show custom mapping operations implemented using an XML-formatted document, custom mapping operations may be implemented in any appropriate manner. The following example is shown using pseudo-code in a rule-based language, although other programmatic formats could be used. For example, the following rule could be used:

IF (substring('loc', <field_name>)
THEN default(<field_name>="UNKNOWN").

This rule indicates that if the field name (or column name) that is currently being processed contains the substring "loc", then the associated database field that is currently being processed is probably a location field, and the current data for the field should be set to a default value.

Figure 6D:
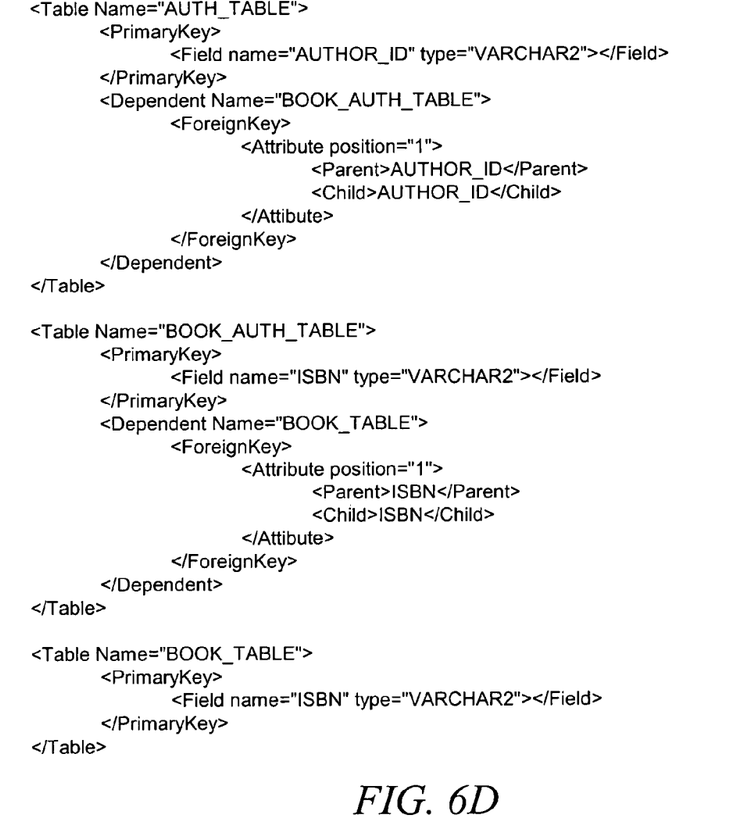

FIG. 6D is an exemplary diagram of a portion of an XML-formatted file showing the dependency relationships of tables in the relational database shown in FIG. 4. As shown in FIG. 6D, the XML file includes a table name, a listing of primary keys, a dependent table name, foreign keys for the dependent table, and the parent-child relationship between the tables. The primary keys designate the key attributes of the table. The dependent table name designates the table(s) that are dependent on the defined table. The foreign key designates the relationship with the dependent table(s). The primary keys and foreign keys of tables in the relational database are designated by the creator of the relational database at the time the tables are created. While the examples in the figures are directed to a book-author application, it should be appreciated that the present invention is not limited to any particular application. Rather, the present invention may be used in many different areas in which relational databases may be used.

The advantages of the present invention should be apparent in view of the detailed description of the invention that is provided above. In the prior art, specialized database tools were required to migrate data from one database to another database.

In the present invention, metadata is obtained from a source database and used to determine the manner in which the data within the source database should be migrated to a target database. The metadata provides a mechanism for structuring queries to retrieve the data within the source database in a generic manner, thereby providing a generic determination of the structure of the data to be migrated. The dependencies among tables in the source database are discovered, thereby providing an order to the migration operations to be performed when migrating the data. This order ensures that the data can be migrated correctly in the presence of referential integrity (foreign key) constraints. In addition, custom mapping operations may be performed during the migration operations so that the data from the source database is modified before writing the data to the target database.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for migrating data between a first database and a second database, the method comprising the steps of:
   determining, by a processing unit in a computer, dependencies among a plurality of tables in the first database;
   storing the determined dependencies to indicate the table dependencies;
   retrieving metadata from the first database, wherein the metadata includes definitions for tables in the first database;
   storing the retrieved metadata;
   reading data from tables in the first database using a plurality of read operations, wherein the read operations are structured in accordance with the retrieved metadata, and wherein the read operations are in an order indicated by the determined dependencies; and
   writing data to the second database using a plurality of write operations, wherein the write operations are in an order indicated by the determined dependencies.

2. The method of claim 1 further comprising:
   performing a predetermined modification operation on the data read from the tables in the first database prior to a write operation to the second database.

3. The method of claim 2 further comprising:
   storing the predetermined modification operation using markup language to identify the predetermined modification operation.

4. The method of claim 2 wherein the predetermined modification operation comprises assigning a default value to a field in a table in the second database that does not have a corresponding field in a corresponding table in the first database.

5. The method of claim 1 wherein the first database and the second database have dissimilar schemas.

6. The method of claim 1 wherein the write operations are in an order indicated by the determined dependencies to ensure referential integrity in the second database.

* * * * *

UNITED STATES PATENT AND TRADEMARK OFFICE
CERTIFICATE OF CORRECTION

| | | |
|---|---|---|
| PATENT NO. | : 7,620,665 B1 | Page 1 of 1 |
| APPLICATION NO. | : 09/717818 | |
| DATED | : November 17, 2009 | |
| INVENTOR(S) | : George et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2099 days.

Signed and Sealed this

Twenty-sixth Day of October, 2010

David J. Kappos
*Director of the United States Patent and Trademark Office*